July 6, 1937.  H. B. WENTWORTH  2,085,842
METHOD AND MEANS FOR DRYING LIGHTWEIGHT MATERIALS
Filed Feb. 15, 1937  2 Sheets-Sheet 2
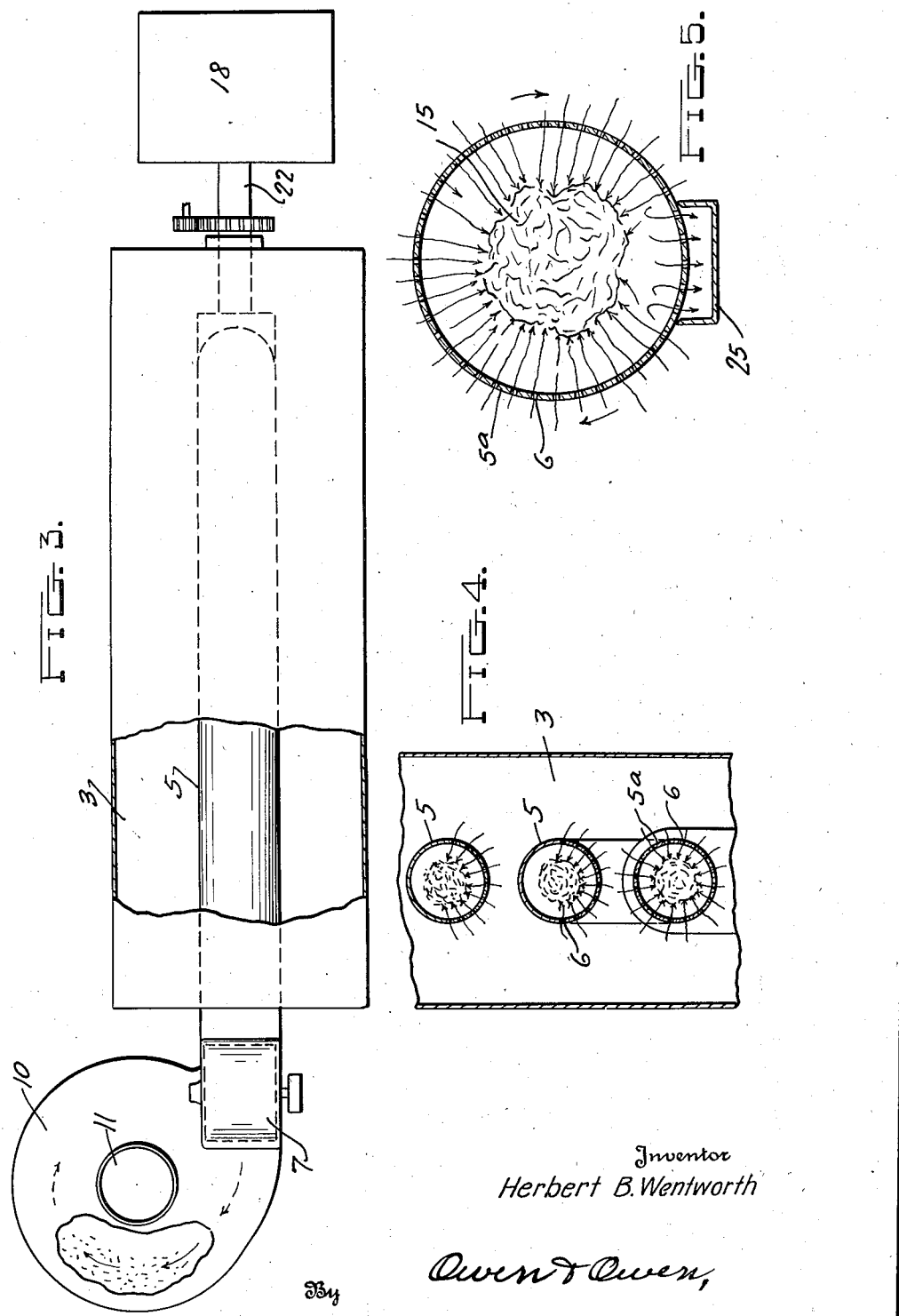
Inventor
Herbert B. Wentworth
By Owen & Owen,
Attorneys Patented July 6, 1937

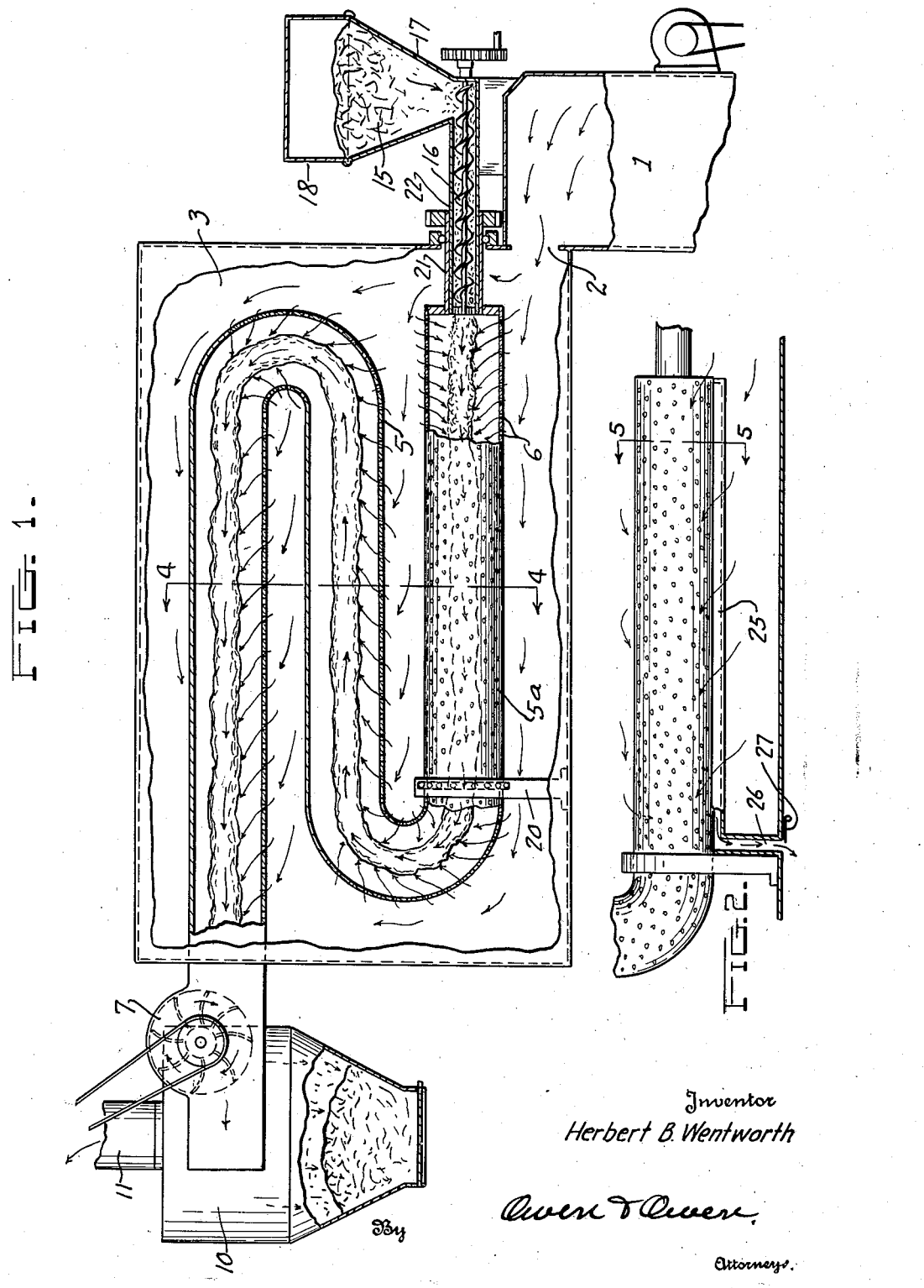

2,085,842

UNITED STATES PATENT OFFICE 2,085,842

METHOD AND MEANS FOR DRYING LIGHT-WEIGHT MATERIALS

Herbert B. Wentworth, Erie, Mich.

Application February 15, 1937, Serial No. 125,735

6 Claims. (Cl. 34—35)

This invention relates to drying of comparatively light weight moisture containing materials, such as forage plants, herbs, legumes, artichokes, and the like.

An object of the invention is the provision of a simple and novel method for drying such materials while being conveyed from one point to another, and of a simple and efficient apparatus for carrying out the method.

A further object of the invention is to utilize a hot gaseous fluid such as air, gases of combustion, or the like, to floatingly convey the material to be dried from one point to another, preferably through a confined path, and to simultaneously effect a drying of the material.

Other objects and advantages of the invention will be apparent from the following detailed description, and from the accompanying drawings, in which—

Figure 1 is a side elevation, with parts broken away, of an apparatus somewhat diagrammatically shown, illustrating the practicing of the method; Fig. 2 is a similar view of a portion of such apparatus with an additional feature in connection therewith; Fig. 3 is a top plan view of the apparatus, with parts broken away; Fig. 4 is a section on the line 4—4 in Fig. 1, and Fig. 5 is an enlarged section on the line 5—5 in Fig. 2.

Referring to the drawings, 1 designates a conduit having communication through a passage 2, with a large chamber 3 in which the drying of the material being acted on takes place, said conduit having communication with a suitable source for supplying hot air or other gases, such for instance as gases of combustion for use in the chamber 3.

Within the chamber 2 is provided a conveyor conduit 5 for receiving at one end the material to be dried and discharging such material from its other end without the chamber 3 and having provision for the introduction of hot gases under pressure therein from chamber 3, whereby the material to be acted on is not only floatingly conveyed through the conduit by the current and supporting action of the gases therein, but is also thoroughly dried by such gases. The conveyor conduit 5 is of suitable length to permit a thorough drying of the material in its passage therethrough, and in the present instance, in order to conserve in length of the chamber 3, this conduit is looped backward and forward in the chamber 3, as shown.

Gas under pressure is admitted to the conduit 5 in a multiplicity of small jets through small openings 6 provided in the circumferential wall of the conduit and also in its entrance end. These orifices are preferably provided entirely around the conduit for a distance from its entrance end and are then reduced in number and area to substantially the point of emergence of the conduit from the chamber 3, so that the number of jets and quantity of air supplied to the conduit are gauged in accordance with the moisture content and consequent weight of the material as it passes through the conduit. In other words, the material, when first discharging into the conduit, has a relatively high moisture content, thus requiring a greater amount of air and combined force of the jets to floatingly support the material and remove the moisture content therefrom than is necessary as the material progresses toward the outlet end of the conduit. In the present instance, the lower or entrance length of the conduit is shown as having air inlet orifices quite closely arranged entirely around the conduit, while the succeeding lengths are shown as having the orifices provided only through the lower half thereof, except at the bends where the orifices are continued around the conduit.

The pressure or force of flow of the gas into and through the conveyor conduit 5 as induced by the force draft means at the source of gas supply or supply in the conduit 1 is augmented by the action of a fan 7 disposed in the outlet end of the conduit 5 without the chamber 3. This force flow of the heated gases into and through the conduit 5 provides a floating support for the material as it is fed into and passes through the conduit, maintaining the material in a swirling divided condition within the conduit to facilitate drying and increasing such swirling action as the material loses its moisture content and becomes lighter.

The discharge end of the conduit 5 opens into a separator 10, in the present instance of the cyclone type, the material dropping to the bottom of the separator and the gases passing from the top through an outlet conduit 11.

The material 15 to be dried is fed to the inlet end of the conveyor conduit 5, in the present instance by a worm type of conveyor 16, which receives its supply from a hopper 17. The hopper 17 is shown as having a cover 18 for use in preventing cold air from being drawn into the conduit 5 through the material feeding means.

In the present instance, the lower or entrance end section of the conduit 5 is mounted for rotary movements within the chamber 3, so that if any portion of the material, as it is introduced into the conduit, is too heavy to be supported by the air until it has been dried to a predetermined extent, such portion of the material will be agitated by rotating action of the lower drum section of the conduit. This drum section, which is designated 5ᵃ, is journaled at one end in a suitable bearing standard 20 and has a bearing sleeve 21 projecting outwardly from its inlet end and rotatably mounted on the tube 22 of the worm conveyor. The other end of the sleeve 21 may be connected in any suitable manner to a driving source.

It is found, in practice, that if the heated gas in the chamber 3 constitutes a gas of combustion taken directly from a combustion chamber, cinders or five fuel particles may be carried into the chamber 3 with the gases and lodge in the orifices 6, thereby closing such orifices and reducing the supply of gas to the entrance end of the conduit 5. If such a clogging of the orifices takes place in the rotating drum section 5ᵃ, the clogging matter may be forced outwardly from the orifices by periodically bringing the orifices in the drum into register with an external outward draft passage. In the present instance, such a passage is provided by disposing a narrow trough-like member 25 (Fig. 2) along one side of the drum, with its side walls in quite close relation to the drum surface so that its interior is practically closed to the chamber 3, and with one end opening without the chamber 3 through a passage 26 which may be closed or regulated by a damper 27. With this arrangement, the direction of flow of the gases through the drum orifices is reversed at a point in each revolution of the drum.

In the practicing of my method, the material to be dried is cut up and deposited in the hopper 17 and is fed therefrom by the worm feed 16 into the inlet end of the conveyor conduit 5. As the material is discharged into the conduit 5 from the feed means, it is caught by the jets of gaseous fluid entering the inlet end portion of the conduit and is divided and whirled within the conduit 1, but is ordinarily at the same time maintained in a more or less column form in spaced relation to the conduit walls, being floatingly supported by the fluid jets. As the material continues through the conduit, it is acted on by successive fluid jets entering the conduit through its wall, thus effecting not only a drying of the material in a rapid and efficient manner by the heated gases, but also causing the material to be carried through the conduit by the fluid current set up therein and at the same time supported out of contact with at least the bottom wall of the conduit by the successive admission of fluid to the conduit through such wall.

Having thus described my invention, what I claim as new, and desire to secure by United States Letters Patent, is:

1. The method of drying light weight material of the class described, which consists in feeding the undried material to a flow directing conduit having a discharge end, setting up a force draft through the conduit, directing a multiplicity of jets of hot gaseous fluid into the conduit sidewise thereof to dry and floatingly carry the material through the conduit, the jets at the entrance end portion of the conduit and at least for a distance forward therefrom being distributed entirely around the conduit, and rotating a portion at least of the part of the conduit having the jets entirely therearound.

2. In an apparatus of the class described, a conduit having a multiplicity of orifices through its side walls and having at least a portion of its length rotatable, means for discharging a material to be dried into said conduit, means for directing hot gaseous fluid under pressure through said orifices into the conduit in enveloping relation to the material to agitate and dry the material and floatingly convey it through the conduit to its discharge end, and means for rotating the rotatable part of the conduit.

3. In an apparatus of the class described, including a conduit having a multiplicity of orifices through its side walls, said orifices being arranged throughout a considerable portion of the length of the conduit and entirely around the conduit for a distance at least from its inlet end, means for feeding a light weight material to be dried into the entrance end of said conduit, said end portion being rotatable, means for directing a hot gaseous fluid under pressure to and through said orifices to floatingly support and carry the material through the conduit and to agitate and dry it during such passage, and means for rotating the entrance end portion of the conduit.

4. In an apparatus of the class described, means forming a chamber to which a hot gaseous fluid is fed under pressure from a source of supply, a conduit disposed in said chamber and having its discharge without the chamber, said conduit being looped backward and forward within the chamber and having a multiplicity of orifices through its side wall throughout substantially the entire portion of the conduit within said chamber, said orifices extending entirely around at least the entrance end portion of the conduit, which portion is rotatable, means for rotating said portion, means for augmenting the force of the fluid current through said conduit, and means for feeding a light weight material to be dried into the entrance end of said conduit, said material being dried and carried through the conduit by the fluid discharged therein from the orifices.

5. In an apparatus of the class described, means forming a chamber to which a hot gaseous fluid is fed under pressure from a source of supply, a conduit in said chamber having a discharge without the chamber, said conduit having a rotatable section at its entrance end and also having a multiplicity of orifices through its side wall and opening communication between its interior and said chamber, whereby fluid is discharged into the conduit in the form of jets from said chamber, said orifices being provided entirely around said rotatable section and through at least the bottom half of the remaining portion of the conduit within said chamber, means for feeding a light weight material to be dried into the entrance end of said rotatable section, such material being dried and carried through the conduit to the discharge end thereof by the fluid discharged therein through said orifices.

6. In an apparatus of the class described, means forming a chamber to which a hot gaseous fluid is fed under pressure from a source of supply, a conduit in said chamber having a discharge without the chamber, said conduit having a rotatable section at its entrance end and also having a multiplicity of orifices opening communication between its interior and said chamber, whereby fluid is discharged into the conduit in the form of jets from said chamber, said orifices being provided entirely around said rotatable section and through at least the bottom half of the remaining portion of the conduit within said chamber, means for feeding a light weight material to be dried into the entrance end of said rotatable section, such material being dried and carried through the conduit to the discharge end thereof by the fluid discharged therein through said orifices, and means at one side of said rotatable section for setting up communication between said orifices and the atmosphere without said chamber when the orifices move into registering relation to said means.

HERBERT B. WENTWORTH.